Patented Nov. 16, 1943

2,334,180

UNITED STATES PATENT OFFICE 2,334,180

α-PYRONE AND METHOD OF PREPARING IT

Robert C. Elderfield, Hastings on Hudson, and Josef Fried, New York, N. Y., assignors to Eli Lilly and Company, Indianapolis, Ind., a corporation of Indiana No Drawing. Application March 21, 1941, Serial No. 384,589

10 Claims. (Cl. 260—344)

This invention relates to α-pyrones and to the methods of preparing them.

The compositions of this invention, when administered to etherized cats, lower the blood pressure of these animals, and these compositions are therefore useful as depressor materials.

The compositions of this invention are represented by the formulas:

(1) 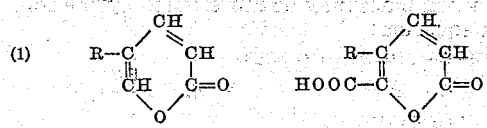

in which R is an aliphatic group, such as a straight chain aliphatic group.

The compositions of this invention are prepared by reacting a compound represented by the formula:

(2)    $R-CH_2-CHO$ in which R has the same meaning as before with malonic acid in the presence of pyridine. This action may be represented by the following equation:

(3) 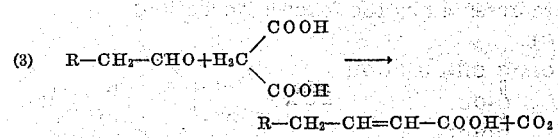

$$R-CH_2-CH=CH-COOH+CO_2$$

The 4-R-2-butene-1-oic acid formed is freed from pyridine and subjected to the action of a primary alcohol ($R_1OH$, in which $R_1$ is an alkyl radical) in the presence of a mineral acid such as sulfuric or hydrochloric acid to yield an ester of the 4-R-2-butene-1-oic acid. Desirably, the alcohol has not greater than five carbon atoms and preferably it is methyl or ethyl alcohol. The mixture is refluxed. The action which takes place may be represented by the following equation:

(4)   $R-CH_2-CH=CH-COOH+R_1OH \rightarrow$
         $R-CH_2-CH=CH-COOR_1+H_2O$

The ester of the 4-R-butene-2-oic acid is then subjected to the action of an ester of oxalic acid [$(COOR_2)_2$ in which $R_2$ is an alkyl radical, preferably the methyl or ethyl radical] in the presence of potassium ion to yield the potassium salt of $R_1$-4-R-5-carbalkoxy-5-hydroxy-2,4-pentadiene-1-oate. Preferably the reaction is carried out in an inert solvent, such as ether, and in the presence of a lower alkyl alcohol, such as methyl or ethyl alcohol. The action which takes place may be represented by the following equation:

(5) 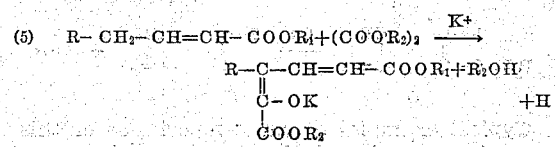

The resulting potassium salt is treated with a dilute acid, such as hydrochloric acid or acetic acid, to substitute a hydrogen ion for the potassium ion in that potassium salt. The action which takes place may be represented by the following equation:

(6) 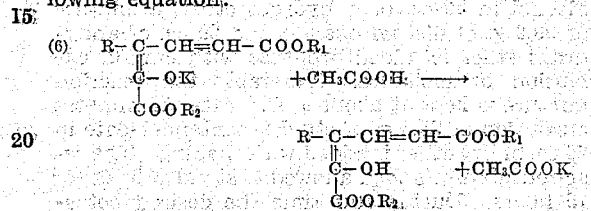

The $R_1$-4-R-5-carbalkoxy-5-hydroxy-2,4-pentadiene-1-oate is freed from inorganic material and is then subjected to the action of a strong aqueous solution of a mineral acid, such as hydrochloric acid, to yield a 4-R-5-carboxy-5-hydroxy-2,4-pentadiene-1-oic acid. The action which takes place may be represented by the following equation:

(7) 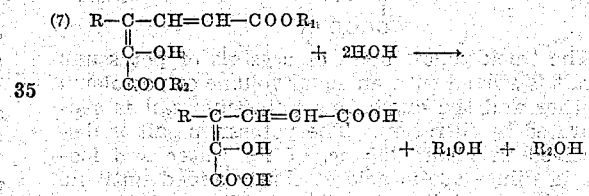

Preferably the reaction is carried out at a temperature of about 70° C. at the start and subsequently at the boiling point of the acid for about 1 hour. The 4-R-5-carboxy-5-hydroxy-2,4-pentadiene-1-oic acid is separated and then subjected to the action of a solution of hydrogen bromide in a lower aliphatic acid such as acetic acid to yield a 5-substituted-6-carboxy-α-pyrone. The action which takes place may be represented by the following equation:

(8) 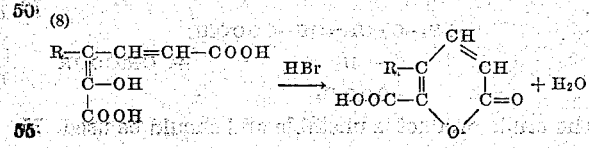

Preferably the reaction is carried out in a sealed vessel and at a temperature of about 150° C.

Alternately, the R₁-4-R-5-carbalkoxy-5-hydroxy-2,4-pentadiene-1-oate may be subjected to the action of hydrogen bromide to yield a 5-substituted-6-carboxy-α-pyrone. This action may be represented by the following equation:

(9)
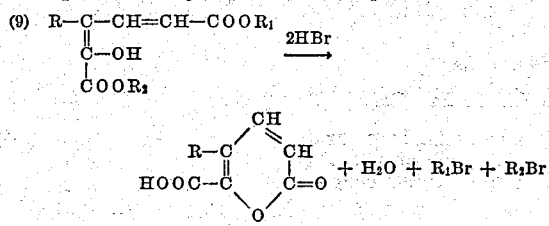

The 5-substituted-6-carboxy-α-pyrone is then subjected to the action of copper to yield the desired 5-substituted-α-pyrone. The action which takes place may be represented by the following equation:

(10)
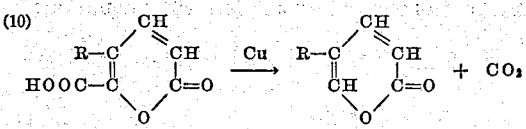

Typical examples of the compositions of this invention and of methods of preparing them are as follows:

EXAMPLE 1.—*Preparation of 5-methyl-α-pyrone*

To a potassium ethylate solution prepared from 7.8 g. of potassium and 34 cc. of absolute ethyl alcohol in 50 cc. of anhydrous ether, a mixture of 29.2 g. of diethyl oxalate and 20 cc. of anhydrous ether is added dropwise with careful exclusion of moisture. Preferably the reaction mixture is kept at about 0° C. After 15 minutes a solution of 25.6 g. of ethyl 2-pentane-1-oate in 20 cc. of dry ether is added with shaking. The reaction mixture is then allowed to stand at 0° C. for 15 hours. During this time the desired potassium salt of ethyl-4-methyl-5-carbethoxy-5-hydroxy-2,4-pentadiene-1-oate is formed. The reaction which takes place may be represented by the following equation

(11)
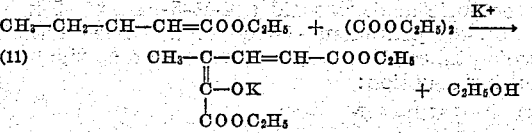

The thick yellow mass of crystals of potassium salt is stirred with an equal volume of petroleum ether and the crystalline potassium salt is separated by filtration. The potassium salt is dissolved in about 750 cc. of ice water and ice-cold dilute acetic acid is slowly added until no further precipitate is formed. After maintaining the reaction mixture at 0° C. for several hours, the desired crystalline ethyl-4-methyl-5-carbethoxy-5-hydroxy-2,4-pentadiene-1-oate is removed by filtration. The action which takes place may be represented by the following equation:

(12)
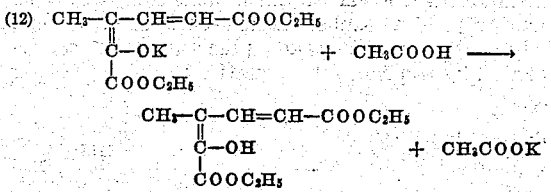

The crude product is unstable and should be used promptly for the next step. It may be stored for a few months in a vacuum desiccator at 0° C. It consists of a mixture of cis, transisomers of ethyl-4-methyl-5-carbethoxy-5-hydroxy-2,4-pentadiene-1-oate, of which the higher-melting form may be isolated and recrystallized preferably from petroleum ether. This higher-melting form melts at about 66°–68° C., corrected. An analysis reveals 58.1 percent carbon and 7.2 percent hydrogen which compares with theoretical values of 57.9 percent carbon and 7.1 percent hydrogen.

To 10 g. of ethyl-4-methyl-5-carbethoxy-5-hydroxy-2,4-pentadiene-1-oate are added 50 cc. of concentrated hydrochloric acid at about 60°–70° C. and the mixture is shaken until completely dissolved. The solution is then refluxed for about 1 hour and then treated with decolorizing carbon. After removal of the solvent, the desired 4-methyl-5-carboxy-5-hydroxy-2,4-pentadiene-1-oic acid remains as a crystalline solid. It may be recrystallized preferably from concentrated hydrochloric acid or from a mixture of acetone and petroleum ether and melts at about 161°–162° C., corrected. An analysis reveals 49.2 percent carbon and 4.8 percent hydrogen which compares with theoretical values of 48.9 percent carbon and 4.7 percent hydrogen. The action which takes place may be represented by the following equation:

(13)
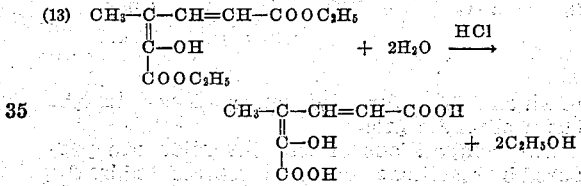

Nine grams of 4-methyl-5-carboxy-5-hydroxy-2,4-pentadiene-1-oic acid are heated at 150° C. for 2 hours in a sealed tube with 30 cc. of glacial acetic acid, which has been previously saturated with hydrogen bromide at 0° C. During this time the desired 5-methyl-6-carboxy-α-pyrone is formed. The action which takes place may be represented by the following equation:

(14)
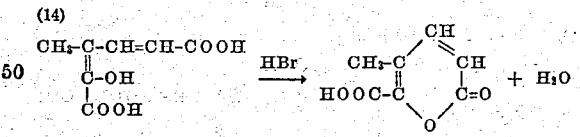

The solvent is removed from the reaction mixture and the crystalline residue of 5-methyl-6-carboxy-α-pyrone may be recrystallized preferably from water with decolorizing carbon or from acetic acid or from acetone. It melts at about 209°–211° C., corrected. An analysis reveals 54.9 percent carbon and 4.1 percent hydrogen which compares with theoretical values of 54.5 percent carbon and 3.9 percent hydrogen.

An intimate mixture of 250 mg. of 5-methyl-6-carboxy-α-pyrone and 2.5 g. of freshly reduced copper powder is placed in a bent glass tube and covered with a layer of pure copper powder. The mixture is then heated gently with a free flame and the desired 5-methyl-α-pyrone distills from the mixture. The action which takes place may be represented by the following equation:

(15)
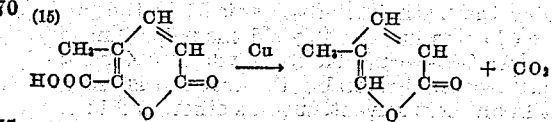

The compound may be purified by distillation and melts at about 17°–19° C., corrected. 5-methyl-α-pyrone dissolves in an alkaline solution with a yellow color, deposits silver from an ammoniacal silver solution and has a characteristic odor of fresh hay. An analysis reveals 65.0 percent carbon and 5.6 percent hydrogen which compares with theoretical values of 65.4 per cent carbon and 5.5 percent hydrogen.

EXAMPLE 2.—*Preparation of 5-methyl-6-carboxy-α-pyrone by the alternate method.*

A solution of 10 g. of ethyl-4-methyl-5-carbethoxy-5-hydroxy-2,4-pentadiene-1-oate is heated for three hours at 150° C. with 35 cc. of glacial acetic acid, which has been previously saturated with hydrogen bromide at 0° C. During this time, the 5-methyl-6-carboxy-α-pyrone is formed. The desired 5-methyl-6-carboxy-α-pyrone is isolated exactly as described in Example 1.

EXAMPLE 3.—*Preparation of 5-ethyl-α-pyrone*

The ethyl - 4 - ethyl-5-carbethoxy-5-hydroxy-2,4-pentadiene-1-oate is produced from ethyl-2-hexene-1-oate and diethyl oxalate in exactly the same manner as described for the analogous compound in Example 1. It is treated with hydrochloric acid to yield 4-ethyl-5-carboxy-5-hydroxy-2,4-pentadiene-1-oic acid exactly as described for the analogous compound in Example 1. The acid is treated with hydrogen bromide in acetic acid to form 5-ethyl-6-carboxy-α-pyrone which melts at about 158°–159° C., corrected. An analysis reveals 57.6 percent carbon and 4.9 per cent hydrogen which compares with theoretical values of 57.2 percent carbon and 4.8 percent hydrogen. The 5-ethyl-6-carboxy-α-pyrone is heated with copper exactly as described for the analogous compound in Example 1 to yield 5-ethyl-α-pyrone which may be purified by distillation. It shows a refractive index value of $n_D^{25}$ 1.5118. Analysis reveals 67.5 percent carbon and 6.7 percent hydrogen which compares with theoretical values of 67.7 percent carbon and 6.5 percent hydrogen. The 5-ethyl-α-pyrone has the following formula:

(16)
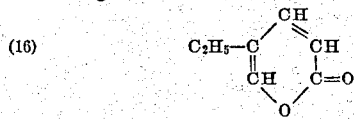

While preferred embodiments of this invention have been described, various modifications may be made therein without departing from the scope of the appended claims.

What is claimed is:

1. A 5-substituted α-pyrone which is represented by the formula:

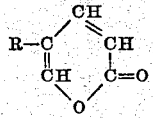

in which R is an aliphatic hydrocarbon group selected from the class consisting of the methyl group and its homologues.

2. 5-methyl-α-pyrone which is represented by the formula:

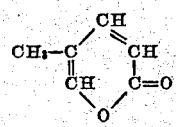

3. 5-ethyl-α-pyrone which is represented by the formula:

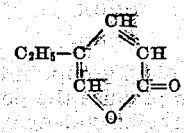

4. A 5-substituted-6-carboxy-α-pyrone which is represented by the formula:

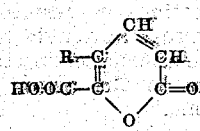

in which R is an aliphatic hydrocarbon group selected from the class consisting of the methyl group and its homologues.

5. 5-ethyl-6-carboxy-α-pyrone which is represented by the formula:

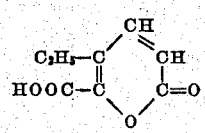

6. The process of preparing a 5-substituted-α-pyrone which comprises subjecting 4-R-5-carboxyl-5-hydroxy-2,4-pentadiene-1-oic acid, in which R is an aliphatic hydrocarbon group selected from the class consisting of the methyl group and its homologues, to the action of hydrogen bromide to form 5-R-6-carboxy-α-pyrone and subjecting the said 5-R-6-carboxy-α-pyrone to the action of copper to form 5-R-α-pyrone.

7. The process of preparing a 5-substituted-α-pyrone which comprises subjecting 5-R-6-carboxy-α-pyrone, in which R is an aliphatic hydrocarbon group selected from the class consisting of the methyl group and its homologues, to the action of copper to form 5-R-α-pyrone.

8. The process of preparing a 5-substituted-6-carboxy-α-pyrone which comprises subjecting 4-R - 5 - carboxy - 5-hydroxy-2,4-pentadiene-1-oic acid, in which R is an aliphatic hydrocarbon group selected from the class consisting of the methyl group and its homologues, to the action of hydrogen bromide to form 5-R-6-carboxy-α-pyrone.

9. The process of preparing a 5-substituted-α-pyrone which comprises subjecting a compound having the formula:

R—CH₂—CHO in which R is an aliphatic hydrocarbon group selected from the class consisting of the methyl group and its homologues, to the action of malonic acid in the presence of pyridine to produce 4-R-butene-2-oic acid, reacting the said 4-R-butene-2-oic acid with a primary alcohol having the formula:

R₁OH in which R₁ is an alkyl group, to form R₁-4-R-2-butene-2-oate, treating the said R₁-4-R-2- butene-2-oate with an ester of oxalic acid having the formula:

in which $R_2$ is an alkyl group, in the presence of a potassium ion to produce the potassium salt of an $R_1$-4-R-5-carbalkoxy-5-hydroxy-2,4-pentadiene-1-oate, treating the said potassium salt with an aqueous acid solution, treating the resulting product with a strong mineral acid to form 4-R-5-carboxyl-5-hydroxy-2,4-pentadiene-1-oic acid, subjecting the resulting product to the action of hydrogen bromide to form 5-R-6-carboxy-α-pyrone and subjecting the said 5-R-6-carboxy-α-pyrone to the action of copper to form 5-R-α-pyrone.

10. An α-pyrone which is represented by the following formula:

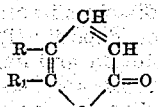

in which R is an aliphatic hydrocarbon group selected from the class consisting of the methyl group and its homologues and $R_1$ is a member selected from the class consisting of hydrogen and the carboxylic group.

ROBERT C. ELDERFIELD.
JOSEF FRIED.

CERTIFICATE OF CORRECTION.

Patent No. 2,334,180.  November 16, 1943.

ROBERT C. ELDERFIELD, ET AL.

It is hereby certified that error appears in the printed specification of the above numbered patent requiring correction as follows: Page 2, first column, line 49, for that portion of the formula reading "$CH_2-CH_2-CH-CH=COOC_2H_5$"   read   --$CH_2-CH_2-CH=CH-COOC_2H_5$--;

and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.